US012791066B2

(12) United States Patent
Kaufhold et al.

(10) Patent No.: US 12,791,066 B2
(45) Date of Patent: Nov. 10, 2026

(54) DRIVE ARRANGEMENT HAVING AN ELECTRICAL MACHINE AND A GEAR AND COMPONENTS FOR SUCH A DRIVE ARRANGEMENT

(71) Applicant: BorgWarner Inc., Auburn Hills, MI (US)

(72) Inventors: Tobias Kaufhold, Sandhausen (DE); Friedrich Philipp Brezger, Karlsruhe (DE); Oliver Groneberg, St. Leon-Rot (DE); Florian Schneider, Hockenheim (DE)

(73) Assignee: BORGWARNER INC., Auburn Hills, MI (US)

( * ) Notice: Subject to any disclaimer, the term of this patent is extended or adjusted under 35 U.S.C. 154(b) by 324 days.

(21) Appl. No.: 18/356,857

(22) Filed: Jul. 21, 2023

(65) Prior Publication Data

US 2024/0035522 A1 Feb. 1, 2024

(30) Foreign Application Priority Data

Jul. 28, 2022 (DE) ......................... 102022002743.7

(51) Int. Cl.
*F16D 7/02* (2006.01)
*F16H 55/17* (2006.01)
(Continued)

(52) U.S. Cl.
CPC ............. *F16D 7/021* (2013.01); *F16H 55/17* (2013.01); *H02K 7/108* (2013.01); *H02K 7/116* (2013.01);
(Continued)

(58) Field of Classification Search
CPC .. F16D 7/021; F16D 2200/0004; F16H 55/17; F16H 2055/178; H02K 7/108; H02K 7/116; Y10T 74/19633
(Continued)

(56) References Cited

U.S. PATENT DOCUMENTS 5,607,023 A * 3/1997 Palm ........................ F16D 7/025 74/411
6,854,556 B1 * 2/2005 Yamamoto .............. F16D 7/021
(Continued)

FOREIGN PATENT DOCUMENTS

DE 102010034691 A1 2/2012
DE 102016124126 A1 6/2018
(Continued)

OTHER PUBLICATIONS

Machine-assisted English language abstract for DE 10 2010 034 691 A1 extracted from espacenet.com database on Sep. 6, 2023, 2 pages.
(Continued)

*Primary Examiner* — Greg Binda
(74) *Attorney, Agent, or Firm* — Howard & Howard Attorneys PLLC

(57) ABSTRACT

A drive arrangement having an electrical machine and a gear are in rotational driving connection with each other while forming at least one torque transmission path, wherein at least one element pair consisting of a torque-transmitting first element and a torque-transmitting second element that are in rotational driving connection with each other via a coupling device is arranged in the torque transmission path is disclosed. The coupling device is designed as a slip clutch, such that the first and second element can be pivoted relative
(Continued)

to each other when a pre-determined torque limit value is exceeded. Components for such a drive arrangement are disclosed.

6 Claims, 3 Drawing Sheets

(51) Int. Cl.
*H02K 7/108* (2006.01)
*H02K 7/116* (2006.01)

(52) U.S. Cl.
CPC ................ *F16D 2200/0004* (2013.01); *F16H 2055/178* (2013.01); *Y10T 74/19633* (2015.01)

(58) Field of Classification Search
USPC ............................................... 74/411; 464/41
See application file for complete search history.

(56) References Cited

U.S. PATENT DOCUMENTS

| | | | |
|---|---|---|---|
| 9,222,565 | B2 | 12/2015 | Pichler et al. |
| 11,473,629 | B2 * | 10/2022 | Haddadin ............... F16D 7/021 |
| 2020/0003264 | A1 | 1/2020 | Lenßen et al. |
| 2021/0293285 | A1 | 9/2021 | Brown et al. |

FOREIGN PATENT DOCUMENTS

| | | | |
|---|---|---|---|
| DE | 102018115186 | A1 | 12/2018 |
| DE | 112019002829 | T5 | 3/2021 |
| DE | 102019133161 | A1 | 6/2021 |
| WO | 2014097927 | A1 | 6/2014 |

OTHER PUBLICATIONS

Machine-assisted English language abstract for DE 10 2016 124 126 A1 extracted from espacenet.com database on Sep. 6, 2023, 3 pages.

Machine-assisted English language abstract and machine-assisted English translation for DE 10 2018 115 186 A1 extracted from espacenet.com database on Sep. 6, 2023, 11 pages.

English language abstract for DE 11 2019 002 829 T5 extracted from espacenet.com database on Sep. 6, 2023, 2 pages.

Machine-assisted English language abstract and machine-assisted English translation for DE 10 2019 133 161 A1 extracted from espacenet.com database on Sep. 6, 2023, 13 pages.

English language abstract for WO 2014/097927 A1 and machine-assisted English translation for equivalent JP 2014-121941 A extracted from espacenet.com database on Sep. 6, 2023, 16 pages.

* cited by examiner

DRIVE ARRANGEMENT HAVING AN ELECTRICAL MACHINE AND A GEAR AND COMPONENTS FOR SUCH A DRIVE ARRANGEMENT

CROSS-REFERENCE TO RELATED APPLICATIONS

This application claims priority pursuant to 35 U.S.C. 119(a) to German Application No. 102022002743.7, filed Jul. 28, 2022, which application is incorporated herein by reference in its entirety.

DESCRIPTION

The present invention relates to a drive arrangement having an electrical machine and a gear in a rotational driving connection with each other while forming at least one torque transmission path, wherein at least one element pair consisting of a torque-transmitting first element and a torque-transmitting second element that are in rotational driving connection with each other via a coupling device is arranged in the torque transmission path. The present invention additionally relates to a component for such a drive arrangement that has a torque-transmitting first element and a torque-transmitting second element that are in rotational driving connection with each another via a coupling device.

BACKGROUND

From practice, electric vehicles are known whose drive arrangement substantially consists of an electrical machine and a gear that are in rotational driving connection with each other while forming at least one torque transmission path, wherein the gear interacts on the output side with a vehicle or wheel axle, for example. Such gears for electric vehicles are designed to be relatively compact and rigid. During particular driving maneuvers, single or successive torque peaks can arise within the known drive arrangements that could consequently lead to an overload in the components of the drive arrangement. This is the case, for example, if a vehicle wheel first loses grip and then grips again. The same is also the case when blocking a wheel via braking. Furthermore, within the known drive arrangements consisting of an electrical machine and a gear, noise generation is sometimes increased.

SUMMARY OF THE INVENTION

It is thus an object of the present invention to develop a conventional drive arrangement such that the components of the drive arrangement are protected from an overload and the noise generation is reduced, with the intention being to produce a design that is as compact and easy to manufacture as possible. In addition, the underlying object of the present invention is to create a correspondingly advantageous component for such a drive arrangement.

This object is achieved by for example, at least some of the features described in the following paragraphs. Alternatively, this object is achieved by multiple features described in the following paragraphs.

The drive arrangement according to the invention is preferably conceived for a motor vehicle. The drive arrangement has an electrical machine and a gear in rotational driving connection with each other while forming at least one torque transmission path. The electrical machine can preferably be operated both as a motor and as a generator.

The gear is preferably a two-speed or multiple-speed gear. In a two-speed gear, for example, two torque transmission paths would be provided within the drive arrangement consisting of an electrical machine and a gear. The drive arrangement has at least one element pair consisting of a torque-transmitting first element and a torque-transmitting second element, wherein the first and second element are in rotational driving connection with each other via a coupling device. The element pair and thus also the coupling device are arranged in the at least one torque transmission path. The coupling device is designed as a slip clutch, such that the first and second element can be pivoted relative to each other when a pre-determined torque limit value is exceeded. If the torque to be transmitted exceeds the pre-determined torque limit value, the slip clutch avoids transmitting the torque exceeding the torque transmission value from one element to the other element and thus protects the downstream components of the drive arrangement from an overload. In the drive arrangement according to the invention, it is additionally preferred if the slip clutch is designed to have a force fit, such that transmission of the torque between the first element and the second element occurs via a force fit, as long as the torque to be transmitted does not exceed the pre-determined torque limit value.

In an advantageous embodiment of the drive arrangement according to the invention, a section of the gear of the arrangement or a gear following the gear forms a differential gear assigned to a vehicle axle of the motor vehicle.

In a particularly advantageous embodiment of the drive arrangement according to the invention, the slip clutch is arranged between the first and the second element in the radial direction to generate a particularly compact arrangement of the slip clutch in relation to the axial directions of the first and second element.

In a further particularly advantageous embodiment of the drive arrangement according to the invention, the slip clutch has a sleeve-like element is arranged between the first and second element while radially pre-tensioned. It is here preferred if the sleeve-like element is arranged, with elastic deformation of the latter, between the first and the second element in order to generate the force-fit connection between the first and the second element specified in the introduction, as long as the torque to be transmitted does not exceed the pre-determined torque limit value. The sleeve-like element contributes to the fact that the element pair can also be particularly compactly constructed in the radial direction of the first and second element, particularly as a sleeve-like element can be designed with relatively thin walls. In this embodiment, it is additionally preferred if the sleeve-like element has elastically-deformable radial ledges to achieve an elastic deformability of the sleeve-like element, wherein the elastic deformability can be pre-defined or pre-determined very precisely via the shape, number and distrbution of the elastically deformable radial ledges. It should further be noted that a sleeve-like element working in a force-fit manner arranged radially pre-tensioned between the first and second element makes very little noise when changing load or similar, such that a significantly reduced noise generation is also ensured via the coupling device in this embodiment.

To ensure that the sleeve-like element can be easily transferred into its intended position between the first and second element, in a further advantageous embodiment of the drive arrangement according to the invention, the sleeve-like element has a break in the circumferential direction. In other words, the sleeve-like element is not continuously annular in the circumferential direction, but rather has a break that can, for example, be designed as a longitudinal slit that extends in the longitudinal direction of the sleeve-like element.

According to a further advantageous embodiment of the drive arrangement according to the invention, the sleeve-like element is made of metal in order to manufacture the coupling device and thus also the entire drive arrangement particularly simply and cost-efficiently. The sleeve-like element can thus be manufactured relatively simply by sheet metal forming.

In a further advantageous embodiment of the drive arrangement according to the invention, the radial ledges are formed as one part with the sleeve-like element to further simplify the manufacture of the sleeve-like element. The radial ledges formed as one part with the sleeve-like element can thus for example be formed as domes and/or tabs. In this embodiment it is additionally preferred if the domes and/or tabs are generated by sheet metal working of a base body of the sleeve-like element, such as for example deep-drawing, embossing or at least partially stamping. Simple domes can thus be generated via embossing. The specified tabs can for example be generated by partially stamping out and bending the tabs.

In a preferred embodiment of the drive arrangement according to the invention, an element pair is provided, in which the first element is a rotor shaft connected to a rotor of the electrical machine in a manner fixed against rotation and the second element is an output shaft of the electrical machine. Additionally, in this embodiment, the slip clutch is incorporated into the electrical machine of the drive arrangement. It is here preferred if the slip clutch is arranged nested with the rotor and/or a stator of the electrical machine in the radial direction to generate a particularly compact design of the electrical machine and thus also a compact design of the drive arrangement. In this embodiment, it is further provided if the slip clutch is integrated into the electrical machine, and thus received in the latter, and/or is arranged in a housing of the electrical machine. In this embodiment, it is additionally advantageous if the previously specified output shaft of the electrical machine protrudes outward out of the housing of the electrical machine.

In a further advantageous embodiment of the drive arrangement according to the invention, an element pair is provided in which the first element is an output shaft of the electrical machine that preferably protrudes outward out of an optionally present housing of the electrical machine, and the second element is an input shaft of the gear. The coupling device designed as a slip clutch is thus substantially arranged on the system border between the electrical machine and the downstream gear. In this embodiment, it has proved advantageous if the input shaft of the gear surrounds the output shaft of the electrical machine from outside in the radial direction with the interposition of the slip clutch. With regard to a particularly secure and stable coupling via the coupling device, it is additionally preferred in this embodiment if the input shaft of the gear is mounted by way of a radial bearing arranged radially nested with the slip clutch, for example on a housing or housing section. The housing or the housing section can for example be a gear housing or a gear housing section. This previously specified radial bearing is preferably, but not necessarily, designed as a rolling bearing.

In a further advantageous embodiment of the drive arrangement according to the invention, an element pair is provided, in which the first element is a gear wheel of the gear and the second element is a gear shaft. The gear wheel is preferably a helical gear wheel. In this very simple embodiment, the previously specified sleeve-like element could thus be arranged in the radial direction between the gear shaft and the gear wheel to be coupled to the gear shaft.

In a particularly preferred embodiment of the drive arrangement according to the invention, the gear has a gear wheel which has a first radial section connected to a gear shaft in a manner fixed against rotation and a second radial section having a gearing, said radial section being arranged radially nested with the first radial section, wherein the first radial section forms the first element and the second radial section forms the second element of an element pair of the drive arrangement. It is here additionally preferred if the first radial section is connected to the gear shaft in a form-fit and/or force-fit manner. In this embodiment it is also preferred if the first radial section is not connected to the gear shaft as one part or formed with the latter. Unlike the previously described embodiment, in which the gear wheel and the gear shaft form the first and second element, in this embodiment, a relatively large diameter of the coupling device designed as a slip clutch can be achieved, especially as the coupling device designed as a slip clutch can be arranged further out in the radial direction between the first and the second radial section of the gear wheel. This has the consequence that a more secure connection of the two radial sections of the gear wheel to one another is possible, whereby a larger pre-determined torque limit value can also be set.

In a further particularly preferred embodiment of the drive arrangement according to the invention, the gear has a freewheel having a first race, a second race and clamping elements arranged between the first and the second race. Thus, for example, the clamping elements can be so-called pawls. Other clamping elements, such as rollers, are also possible, however. It is additionally preferred if the freewheel is designed as a switchable freewheel that can be transferred into at least two different operating modes by operating the same. In this embodiment, an element pair of the drive arrangement is provided in which the first element is a gear shaft of the gear and the second element is a freewheel hub connected to the first race in a manner fixed against rotation. Alternatively, the first element is a freewheel hub connected to a gear shaft in a manner fixed against rotation, optionally in a form-fit and/or force-fit manner and/or not as one part, and the second element is the first race of the freewheel. In the specified alternative, the coupling device designed as a slip clutch can be arranged further out in the radial direction in turn, optionally to obtain a more secure connection and a higher pre-determined torque limit value. The alternatively specified embodiment also has the advantage that a first race generally designed separately from the freewheel hub can be fixed to said freewheel hub particularly easily via the slip clutch.

In a further particularly preferred embodiment of the drive arrangement according to the invention, the gear has a gear wheel arranged on a gear shaft and having a helical gearing and a first straight gearing, and a torque-transmitting sleeve arranged on the gear shaft and having a second straight gearing which is in rotational driving engagement with the first straight gearing. The torque-transmitting sleeve here forms the first element and the gear shaft forms the second element of an element pair of the drive arrangement. In this embodiment, it is ensured that only tangential forces act on the torque-transmitting sleeve and thus also on the coupling device, as the axial forces naturally acting on the gear wheel having a helical gearing are not transmitted to the torque-transmitting sleeve, and thus to the coupling device, via the first and second straight gearing. A particularly secure and functional arrangement of a slip clutch is thus guaranteed, whereby a relatively compact design of the gear wheel can also be achieved in the radial direction and tilting of the helical gear wheel can be substantially avoided.

In a further advantageous embodiment of the drive arrangement according to the invention, the previously specified first straight gearing on the gear wheel is an outer gearing, while the second straight gearing on the torque-transmitting sleeve is an inner gearing.

According to a further advantageous embodiment of the drive arrangement according to the invention, the previously specified helical gear wheel is or can be supported on the gear shaft in the axial direction via a retaining ring so that potential axial forces acting on the helical gear wheel can be supported on the gear shaft. In this embodiment, it is preferred if the retaining ring is or can be radially supported on a locking ring and/or the torque-transmitting sleeve while preventing the retaining ring from widening to ensure a permanently secure arrangement and thus permanently secure support of the gear wheel on the retaining ring in the axial direction.

The component according to the invention for a drive arrangement of the type according to the invention has a torque-transmitting first element, a torque-transmitting second element and a coupling device via which the first element and the second element are in rotational driving connection with each other, wherein the coupling device is designed as a slip clutch such that the first and the second element can be pivoted relative to each other when a pre-determined torque limit value is exceeded. With regard to possible embodiments of the coupling device designed as a slip clutch, refer to the previously described embodiments of the slip clutch within the drive arrangement according to the invention, which applies correspondingly to the component for a drive arrangement.

In an advantageous embodiment of the component according to the invention, the component is an electrical machine in which the first element is a rotor shaft connected to a rotor of the electrical machine in a manner fixed against rotation and the second element is an output shaft of the electrical machine. It is preferred here if the slip clutch is arranged nested with the rotor and/or a stator of the electrical machine in the radial direction. It is here additionally preferred if the slip clutch is integrated into the electrical machine. As an alternative or in addition, it is preferred if the slip clutch is arranged in a housing of the electrical machine. As an alternative or in addition, the output shaft of the electrical machine is designed such that it protrudes outwards out of the housing of the electrical machine.

In a further advantageous embodiment of the component according to the invention, the component is a gear wheel, in which the first element is a first radial section of the gear wheel that can be connected to a gear shaft in a manner fixed against rotation and the second element is a second radial section of the gear wheel having a gearing, arranged radially nested with the first radial section.

In a further advantageous embodiment of the component according to the invention, the component is an optionally switchable freewheel having a first race, a second race and clamping elements arranged between the races, in which the first element is a freewheel hub that can be connected to a gear shaft in a manner fixed against rotation and the second element is the first race.

In a further advantageous embodiment of the component according to the invention, the component is a torque-transmitting device that has a gear shaft, a gear wheel arranged on the gear shaft and having a helical gearing and a first straight gearing, and a torque-transmitting sleeve arranged on the gear shaft and having a second straight gearing. The second straight gearing is in rotational driving engagement with the first straight gearing, wherein the torque-transmitting sleeve forms the first element and the gear shaft forms the second element, between which elements the coupling device designed as a slip clutch acts.

With regard to the advantages of the different embodiments of the component according to the invention, refer to the preceding description of corresponding components within the drive arrangement according to the invention, with the preceding embodiments applying correspondingly to the individual components.

BRIEF DESCRIPTION OF THE DRAWINGS

The invention is explained in more detail below using exemplary embodiments with reference to the attached drawings. In the following.

DETAILED DESCRIPTION

Figure 1:
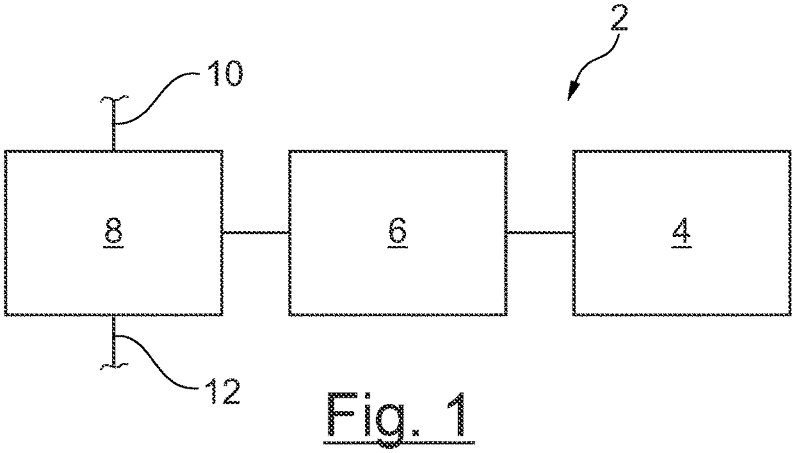
FIG. 1 shows a schematic depiction of an embodiment of the drive arrangement according to the invention for a motor vehicle for or within a motor vehicle.

FIG. 1 shows a schematic depiction of a drive arrangement 2. The drive arrangement 2 has an electrical machine 4 such that the drive arrangement 2 can preferably be used in an electric motor vehicle. The electrical machine 4 or its output side is in rotational driving connection with a gear 6 or its input side. By contrast, the output side of the gear 6 is in rotational driving connection with the input side of a differential gear 8, wherein the differential gear 8 is assigned to the two half axles 10, 12 of a vehicle axle of the motor vehicle in a known manner. Although the differential gear 8 is here shown as a differential gear 8 spaced apart from the gear 6, the differential gear 8 can also be assigned to the gear 6 or form a gear section of the gear 6. The electrical machine 4, the gear 6 and the differential gear 8 thus form at least one torque transmission path with one another, via which a torque can be transmitted from the electrical machine 4 to the vehicle axle and vice versa. The gear 6 is preferably designed as a two or multiple speed gear.

To protect the gear 6, which is designed to be particularly rigid for electric vehicles, and the entire drive arrangement 2 and its components from an overload, at least one mechanical torque limiter is integrated into the drive arrangement 2. Generally, at least one element pair 14 consisting of a torque-transmitting first element 16 and a torque-transmitting second element 18 is provided, which elements are in rotational driving connection with each other via a coupling device 20, wherein the first element 16, the second element 18 and the coupling device 20 are arranged in the torque transmission path of the drive arrangement 2. Before the different embodiments of the possible element pairs 14 are explained in more detail, the basic structure of these element pairs 14 will be explained in more detail in the following in connection with the coupling device 20.

Figure 2:
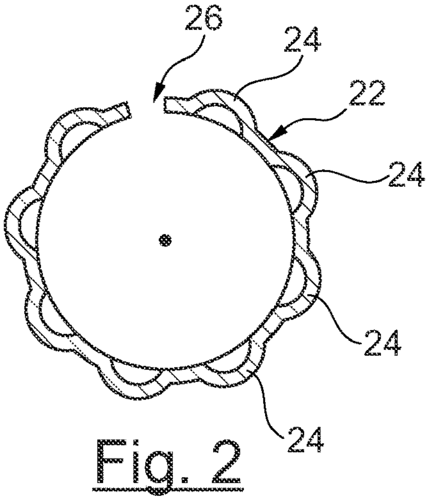
FIG. 2 shows a front view of a sleeve-like element in a cut-away depiction.
Figure 3:
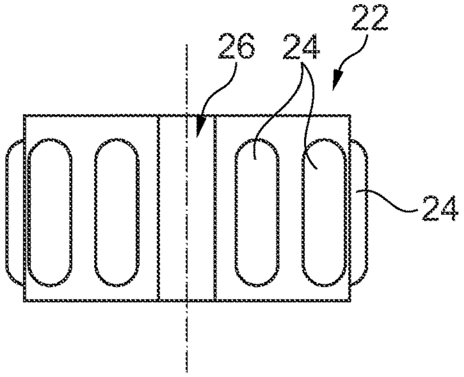
FIG. 3 shows a side view of the sleeve-like element from FIG. 2.

The coupling device 20 is designed as a slip clutch, such that the first and second element 16, 18 can be pivoted relative to each other when a pre-determined torque limit value is exceeded. The coupling device 20 does not couple the first and second elements 16, 18 in a form-fit manner, but rather in a force-fit manner. The slip clutch is arranged between the first element 16 and the second element 18 in the radial direction and has a sleeve-like element 22 arranged radially pre-tensioned between the first and second element 16, 18, as can be understood from FIGS. 4 to 9. To be more precise, the sleeve-like element 22 is arranged, with elastic deformation of the latter, between the first and second element 16, 18, with the sleeve-like element 22 depicted in detail in FIGS. 2 and 3 having elastically deformable radial ledges 24 for this purpose.

In the depicted embodiment, the radial ledges 24 are formed as one part with the sleeve-like element 22 and formed by domes. It is here preferred if the domes are generated by embossing a base body of the sleeve-like element 22. It has also proved advantageous if the sleeve-like element 22 is made of metal and thus by analogy forms a sheet metal part. As an alternative to the radial ledges 24 in the form of the domes depicted, tabs are also considered as radial ledges, which can be partially stamped and bent out of the base body of the sleeve-like element 22. It is also possible, unlike the depiction in FIGS. 2 and 3, to allow the radial ledges 24 to protrude inward in the radial direction instead of outward in the radial direction as depicted. A break 26 is additionally designed in the sleeve-like element 22, such that the sleeve-like element 22 does not have a continuous course in the circumferential direction, but has a break 26, which is here designed in the form of a longitudinal slit in an advantageous manner.

In the following, different embodiments of an element pair 14 for the drive arrangement 2 according to FIG. 1 are described with reference to FIGS. 4 to 9, which can also represent components for use in the drive arrangement 2.

Figure 4:
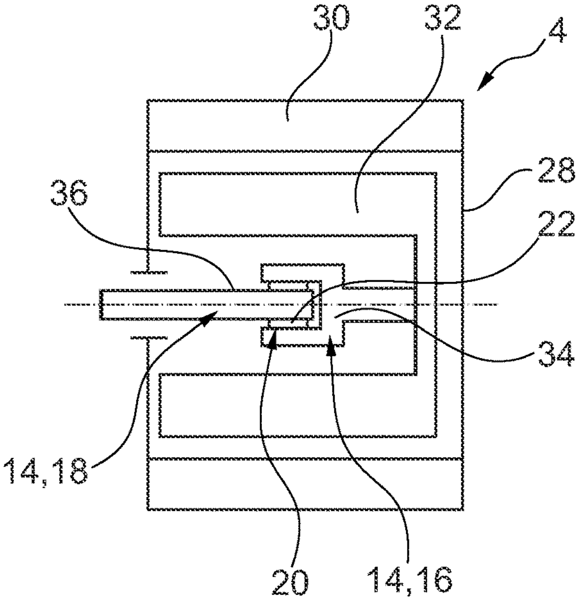
FIG. 4 shows a schematic side view of a first embodiment of an element pair in the drive arrangement according to FIG. 1.

FIG. 4 shows a component for the drive arrangement 2 in the form of the electrical machine 4. The electrical machine 4 has a stator 30 and a rotor 32 within a housing 28. The rotor 32 is connected in a manner fixed against rotation to a rotor shaft 34 that forms the first element 16 of the element pair 14. By contrast, the second element 18 of the element pair 14 is formed by an output shaft 36 of the electrical machine 4 that protrudes outward out of the housing 28 via an opening so that it can be connected to the gear 6. The sleeve-like element 22 is arranged nested both with the rotor 32 and with the stator 30 of the electrical machine 4 in the radial direction, with the slip clutch formed by the sleeve-like element 22 being by analogy integrated into the electrical machine 4 or arranged in the housing 28 of the electrical machine 4.

Figure 5:
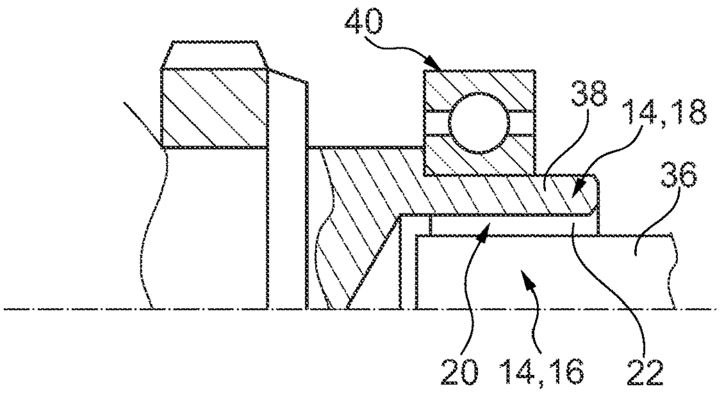
FIG. 5 shows a partial side view of a second embodiment of an element pair in the drive arrangement according to FIG. 1.

As an alternative or in addition to the element pair 14 from FIG. 4, the element pair 14 from FIG. 5 can also be provided in the drive arrangement 2. In the second embodiment according to FIG. 5, the element pair 14 consists of a first element 16 in the form of the output shaft 36 of the electrical machine 4 and the second element 18 in the form of an input shaft 38 of the gear 6, between which elements the sleeve-like element 22 is arranged nested in the radial direction. It is here preferred if the input shaft 38 of the gear 6 surrounds the output shaft 36 of the electrical machine 4 from outside in the radial direction with the interposition of the slip clutch or the sleeve-like element 22, and the input shaft 38 of the gear 6 is further mounted by way of a radial bearing 40 arranged radially nested with the slip clutch. The mounting via the radial bearing 40, which is preferably designed as a rolling bearing, is particularly preferably achieved on a fixed housing or housing section, for example a housing of the gear 6.

Figure 6:
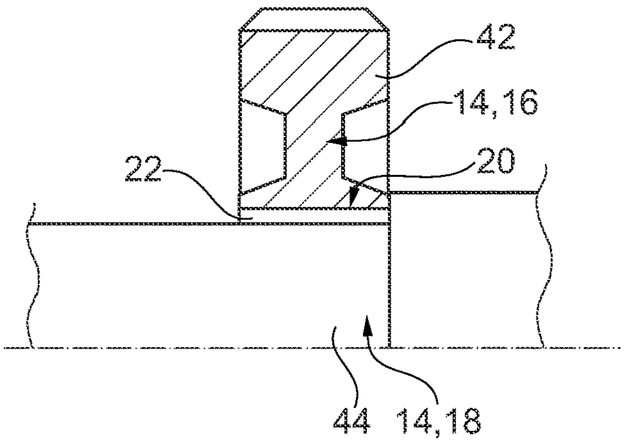
FIG. 6 shows a partial side view of a third embodiment of an element pair in the drive arrangement according to FIG. 1.

FIG. 6 shows a third embodiment of an element pair 14 in the drive arrangement 2 which can be used as an alternative or in addition to one or several of the element pairs 14 according to FIGS. 4 and 5. In the third embodiment, the element pair 14 is formed by a first element 16 in the form of a helical gear wheel 42 of the gear 6 and a second element 18 in the form of a gear shaft 44, such that the sleeve-like element 22 of the slip clutch is arranged between the gear shaft 44 on the one hand and the gear wheel 42 on the other in the radial direction.

Figure 7:
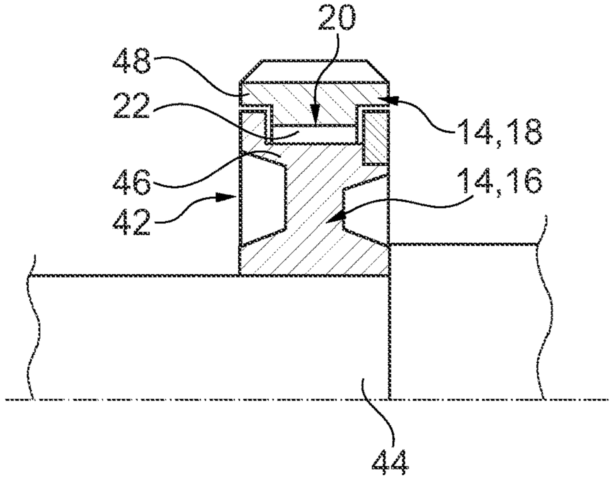
FIG. 7 shows a partial side view of a fourth embodiment of an element pair in the drive arrangement according to FIG. 1.

FIG. 7 shows a fourth embodiment of an element pair 14 for use in the drive arrangement 2 according to FIG. 1 that can be used as an alternative or in addition to the element pairs 14 according to FIGS. 4 to 6. The element pair 14 in the fourth embodiment is formed by a gear wheel 42 of the gear 6, wherein unlike in the embodiment according to FIG. 6, the gear wheel 42 has a first radial section 46 connected to a gear shaft 44 in a manner fixed against rotation and a second radial section 48 having a gearing and arranged radially nested with the first radial section 46. The first radial section 46 forms the first element 16 and the second radial section 48 forms the second element 18 of the element pair 14 such that the sleeve-like element 22 is arranged between the first and the second radial section 46, 48 in the radial direction. This embodiment is preferred to the embodiment according to FIG. 6 in as far as the sleeve-like element 22 can be arranged on a particularly large diameter, whereby a particularly high pre-determined torque limit value can be set. The first radial section 46 itself is preferably fixed to the gear shaft 44 in a manner fixed against rotation in a form-fit and/or force-fit manner, but particularly preferably not formed as one part with the gear shift 44. The gear shaft 44, the first radial section 46 and the second radial section 48 in connection with the sleeve-like element 22 also form a component for use within the drive arrangement 2 according to FIG. 1.

Figure 8:
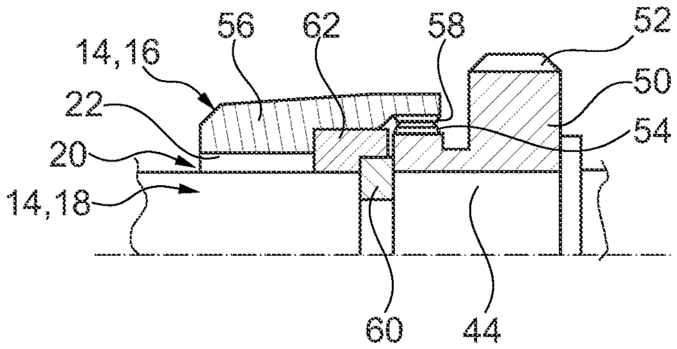
FIG. 8 shows a partial side view of a fifth embodiment of an element pair in the drive arrangement according to FIG. 1.

FIG. 8 shows a further element pair 14 or a further component for use in the drive arrangement 2 according to FIG. 1. The fifth embodiment according to FIG. 8 can find use as an alternative or in addition to the embodiments according to FIGS. 4 to 7 in the drive arrangement 2. According to FIG. 8, the gear 6 has a gear wheel 50 arranged on a gear shaft 44, wherein the gear wheel 50 has a helical gearing 52 and a first straight gearing 54 offset in the axial direction in relation to the helical gearing 52. There is no direct form-fit rotational driving connection between the gear wheel 50 and the gear shaft 44. A torque-transmitting sleeve 56 that has a second straight gearing 58 is additionally arranged on the gear shaft 44. As can be seen from FIG. 8, the first straight gearing 54 is designed as an outer gearing, while the second straight gearing 58 is designed as an inner gearing, wherein the first and second straight gearing 54, 58 are in rotational driving engagement with each other. In this arrangement, the torque-transmitting sleeve 56 forms the first element 16 and the gear shaft 44 forms the second element 18 of the element pair 14, such that an indirect rotational driving connection arises between the gear shaft 44 and the gear wheel 50, i.e., the rotational driving connection between the gear shaft 44 and the gear wheel 50 is made via the sleeve-like element 22 between the gear shaft 44 and the torque-transmitting sleeve 56 and the two straight gearings 54, 58 which are in rotational driving engagement with one another.

Additionally, the gear wheel 50 is or can be supported on the gear shaft 44 in the axial direction via a retaining ring 60, wherein the retaining ring 60 is or can be supported outward in the radial direction on a locking ring 62 while preventing the retaining ring 60 from widening. Alternatively, the torque-transmitting sleeve 56 can function as a locking ring on which the retaining ring 60 can be or is supported outward in the radial direction such that the separate locking ring 62 is not required.

The advantage of the embodiment according to FIG. 8 is that tangential forces substantially act on the torque-transmitting sleeve 56, and thus on the sleeve-like element 22, but not axial forces which could act in the axial direction on the gear wheel 50 and thus on the torque-transmitting sleeve 56 and the sleeve-like element 22 due to the helical gearing 52 on the gear wheel 50. This is prevented by the helical gearings 54, 58 and the support of the gear wheel 50 on the retaining ring 60 in the axial direction, however.

Figure 9A:
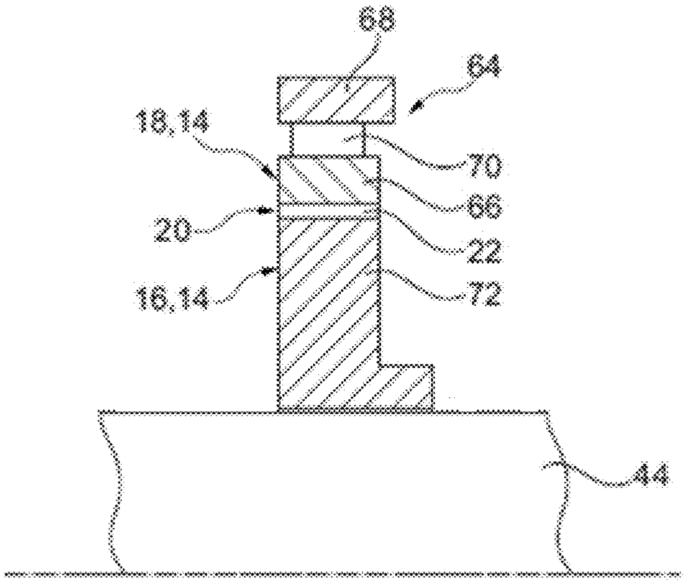
FIG. 9A shows a partial side view of a sixth embodiment of an element pair in the drive arrangement according to FIG. 1 in a cut-away depiction.
Figure 9B:
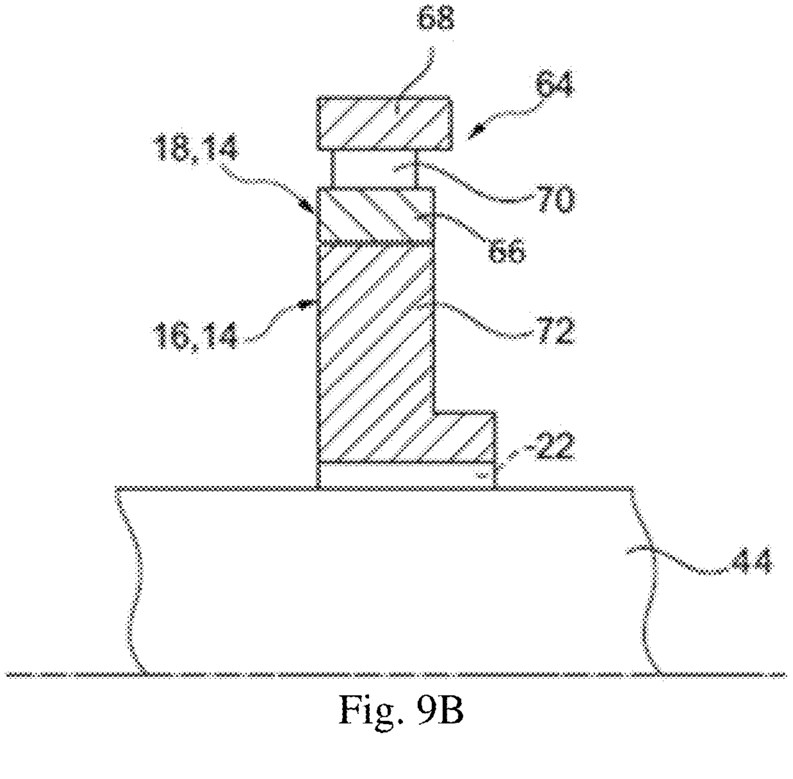
FIG. 9B shows a partial side view of a seventh embodiment of an element pair in the drive arrangement according to FIG. 1 in a cut-away depiction.

Two further embodiments of an element pair 14 or of a component for the drive arrangement 2 according to FIG. 1 are indicated in FIG. 9A and FIG. 9B, respectively. In the embodiment of FIG. 9A, the gear 6 has a preferably switchable freewheel 64 having a first race 66, a second race 68 and clamping elements 70 arranged between the first and second race 66, 68. The element pair 14 is preferably formed by a first element 16 in the form of a freewheel hub 72 connected to a gear shaft 44 in a manner fixed against rotation and a second element 18 in the form of the first race 66, between which elements the sleeve-like element 22 of the slip clutch is arranged in the radial direction. The freewheel hub 72 is preferably connected to the gear shaft 44 in a form-fit and/or force-fit manner and/or not as one part.

Regardless, a variant is additionally indicated in FIG. 9B in which the element pair is formed of a first element in the form of the gear shaft 44 and a second element in the form of the freewheel hub 72 connected to the first race 66 in a manner fixed against rotation, wherein here too—analogously with the previously described embodiments—the variant with a sleeve-like element 22 arranged further out in the radial direction is preferred so that a particularly high pre-determined torque limit value can be achieved.

LIST OF REFERENCE NUMERALS

2 drive arrangement
4 electrical machine
6 gear
8 differential gear
10 half axle
12 half axle
14 element pair
16 first element
18 second element
20 coupling device
22 sleeve-like element
24 radial ledge
26 break
28 housing
30 stator
32 rotor
34 rotor shaft
36 output shaft
38 input shaft
40 radial bearing
42 gear wheel
44 gear shaft
46 first radial section
48 second radial section
50 gear wheel
52 helical gearing
54 first straight gearing
56 torque-transmitting sleeve
58 second straight gearing
60 retaining ring
62 locking ring
64 freewheel
66 first race
68 second race
70 clamping element
72 freewheel hub

The invention claimed is:

1. Drive arrangement having an electrical machine and a gear which are in rotational driving connection with each other while forming at least one torque transmission path,
wherein at least one element pair consisting of a torque-transmitting first element and a torque-transmitting second element which are in rotational driving connection with each other via a coupling device is arranged in the torque transmission path,
wherein the coupling device is designed as a slip clutch, so that the first and second element can be pivoted relative to each another when a pre-determined torque limit value is exceeded, wherein the gear has a gear wheel, arranged on a gear shaft and having a helical gearing and a first straight gearing, and a torque-transmitting sleeve arranged on the gear shaft and having a second straight gearing which is in rotational driving engagement with the first straight gearing, wherein the torque-transmitting sleeve forms the first element and the gear shaft forms the second element of an element pair, the first straight gearing is a male external gearing, while the second straight gearing is an female internal gearing.

2. Drive arrangement according to claim 1, wherein the slip clutch is arranged between the first and second element in the radial direction and has a sleeve-like element arranged between the first and second element while radially pretensioned.

3. Drive arrangement according to claim 2, wherein the sleeve-like element has a break in the circumferential direction and/or is made of metal and/or radial ledges are formed as one part with the sleeve-like element, formed by domes and/or tabs.

4. Drive arrangement according to claim 2, wherein the sleeve-like element has elastically deformable radial ledges.

5. Drive arrangement according to claim 1, wherein the gear wheel is or can be supported on the gear shaft in the axial direction via a retaining ring, said retaining ring being or being able to be radially supported on a locking ring and/or the torque-transmitting sleeve while preventing the retaining ring from widening.

6. Component for a drive arrangement having a torque-transmitting first element and a torque-transmitting second element which are in rotational driving connection with each other via a coupling device, wherein the coupling device is designed as a slip clutch such that the first and second element can be pivoted relative to each other when a pre-determined torque limit value is exceeded, wherein the component is:

a torque-transmitting device that has a gear shaft, a gear wheel arranged on the gear shaft and having a helical gearing and a first straight gearing, and a torque-transmitting sleeve arranged on the gear shaft and having a second straight gearing which is in rotational driving engagement with the first straight gearing, wherein the torque-transmitting sleeve forms the first element and the gear shaft forms the second element.

* * * * *